United States Patent
Ito et al.

(10) Patent No.: US 12,492,285 B2
(45) Date of Patent: Dec. 9, 2025

(54) EPOXY RESIN COMPOSITION, PREPREG AND FIBER-REINFORCED COMPOSITE MATERIAL

(71) Applicant: TORAY INDUSTRIES, INC., Tokyo (JP)

(72) Inventors: Akihiko Ito, Iyo-gun (JP); Hiroaki Sakata, Iyo-gun (JP)

(73) Assignee: TORAY INDUSTRIES, INC., Tokyo (JP)

( * ) Notice: Subject to any disclaimer, the term of this patent is extended or adjusted under 35 U.S.C. 154(b) by 728 days.

(21) Appl. No.: 17/771,870

(22) PCT Filed: Jan. 22, 2021

(86) PCT No.: PCT/JP2021/002161
§ 371 (c)(1),
(2) Date: Apr. 26, 2022

(87) PCT Pub. No.: WO2021/161757
PCT Pub. Date: Aug. 19, 2021

(65) Prior Publication Data
US 2022/0372209 A1    Nov. 24, 2022

(30) Foreign Application Priority Data
Feb. 10, 2020 (JP) ................... 2020-020301

(51) Int. Cl.
| | | |
|---|---|---|
| C08G 59/32 | (2006.01) | |
| C08G 59/24 | (2006.01) | |
| C08G 59/28 | (2006.01) | |
| C08G 59/40 | (2006.01) | |
| C08J 5/24 | (2006.01) | |
| C08L 81/06 | (2006.01) | |

(52) U.S. Cl.
CPC ........... *C08G 59/28* (2013.01); *C08G 59/245* (2013.01); *C08G 59/3227* (2013.01); *C08G 59/3272* (2013.01); *C08G 59/4064* (2013.01); *C08J 5/243* (2021.05); *C08L 81/06* (2013.01); *C08L 2201/02* (2013.01); *C08L 2205/02* (2013.01); *C08L 2205/03* (2013.01)

(58) Field of Classification Search
CPC .. C08G 59/28; C08G 59/245; C08G 59/3227; C08G 59/3272; C08L 2201/02; C08L 2205/02; C08L 2205/03; C08J 5/243
USPC ......................................................... 524/428
See application file for complete search history.

(56) References Cited

U.S. PATENT DOCUMENTS
2020/0247986 A1    8/2020    Ito et al.

FOREIGN PATENT DOCUMENTS

| CN | 1548473 A | 11/2004 |
|---|---|---|
| CN | 102653149 A | 9/2012 |
| CN | 103408903 A | 11/2013 |
| CN | 104987664 A | 10/2015 |
| JP | 2016-132709 A | 7/2016 |
| WO | WO 2019/082595 A1 | 5/2019 |

OTHER PUBLICATIONS

Patel et al., Glass fiber reinforced composites of phosphorus containing epoxy resin systems, High Performance Polymers, vol. 3, No. 4, p. 237-242 (Year: 1991).*
International Search Report, issued in PCT/JP2021/002161, PCT/ISA/210, dated Apr. 13, 2021.
Written Opinion of the International Searching Authority, issued in PCT/JP2021/002161, PCT/ISA/237, dated Apr. 13, 2021.

* cited by examiner

*Primary Examiner* — Ruiyun Zhang
(74) *Attorney, Agent, or Firm* — Birch, Stewart, Kolasch & Birch, LLP

(57) ABSTRACT

The purpose of the present invention is to provide: an epoxy resin composition which enables the achievement of a resin cured product that has high flame retardancy and excellent mechanical characteristics; and a prepreg and a fiber-reinforced composite material, each of which uses this epoxy resin composition. One embodiment of the epoxy resin composition according to the present invention, said epoxy resin composition having achieved the above-described purpose, contains the components (A) and (B) described below. (A): a bifunctional glycidyl amine type epoxy compound (B): an epoxy compound having a specific structure and/or an epoxy compound having another specific structure.

7 Claims, No Drawings

EPOXY RESIN COMPOSITION, PREPREG AND FIBER-REINFORCED COMPOSITE MATERIAL

TECHNICAL HELD

The present invention relates to an epoxy resin composition, a prepreg, and a fiber reinforced composite material that include a phosphorus atom-containing epoxy compound having a specific structure and a bifunctional glycidylamine type epoxy compound.

BACKGROUND ART

In the fields of composite materials that contains carbon fiber, glass fiber, or the like as reinforcing fiber and thermosetting resin such as epoxy resin and phenol resin as matrix resin, intermediate base materials that contain reinforcing fibers impregnated with resin, namely, so-called prepreg, are now used for the production of a variety of products ranging from sports and leisure devices such as fishing rods and tennis and badminton rackets to different industrial materials for civil engineering and aerospace industries. However, most thermosetting resins are flammable and can cause fires, and therefore, the development of flame retardant thermosetting resins is strongly called for to reduce accidents due to ignition combustion particularly in the fields of structural materials such as for aircraft and vehicles. Flame retardant materials are also demanded in the fields of electronic and electrical instruments in order to prevent housing and parts from igniting and burning due to internal heat generation, which can lead to accidents.

In many cases, an additive that serves to make a material less combustible, namely, so-called flame retardant, is added as means of preparing a flame retardant matrix resin. Generally used flame retardants include halogenated compounds, phosphorus compounds, metal hydroxide, silicon compounds, and nitrogen compounds, of which some phosphorus compounds are commonly used for industrial applications because phosphorus compounds can form cured products that have good physical properties. Flame retardance improving techniques that use such phosphorus compounds include the technique of adding an additive type flame retardant such as red phosphorus or a phosphoric acid ester to an epoxy resin composition and the technique of using a reactive type flame retardant that contains a phosphorus atom in the molecule and works to cause a reaction with a resin in order to introduce phosphorus atoms into a crosslinked structure.

Patent document 1 proposes a flame retardance improving technique that uses a phosphoric acid ester. As compared with red phosphorus, phosphoric acid esters contain a smaller number of phosphorus atoms in the compounds, and accordingly, they are needed in large amounts in order to realize a sufficient level of fire retardance. In this case, such phosphoric acid esters can act as plasticizer to cause a large decrease in the heat resistance, mechanical characteristics, etc. of resins, making it difficult to realize a good balance between their fire retardance and mechanical characteristics.

To avoid this, Non-patent document 1 proposes a fire retardance improvement technique that uses an epoxy group-containing phosphine oxide having a structure in which phosphorus atoms and carbon bonds are connected through covalent bonds in the molecule, Furthermore, Patent document 2 describes a fire retardance improvement technique using a phosphoric atom-containing epoxy compound that has a specific structure. As a result of containing epoxy groups, these phosphorus compounds can react with a curing agent to form a crosslinked structure, making it possible to produce a product that can develop fire retardance without suffering a large deterioration in mechanical characteristics.

PRIOR ART DOCUMENTS

Patent Documents

Patent document 1: Japanese Patent No, 5614280
Patent document 2: Chinese Unexamined Patent Application Publication No. 102653149

Non-Patent Documents

Non-patent document 1: High Performance Polymers, Vol.3, No.4, 1991

SUMMARY OF INVENTION

Problems to Be Solved By the Invention

However, the use of a phosphine oxide containing an epoxy group or an epoxy compound containing a phosphorus atom such as described in Non-patent document 1 or Patent document 2 cannot serve to produce a cured resin product that has a sufficient level of fire retardance and mechanical characteristics.

Thus, the main object of the present invention is to solve the above problems and to provide an epoxy resin composition that can form a cured resin product having a high fire retardance and mechanical characteristics as a result of curing the epoxy resin composition according to the present invention and also provide a prepreg and a fiber reinforced composite material formed thereof.

Means of Solving the Problems

To solve the above problem, the epoxy resin composition according to the invention is configured as described below. Specifically, it provides an epoxy resin composition containing the components [A] and [B] specified below

[A] a bifunctional glycidylamine type epoxy compound, and

[B] an epoxy compound having a structure as represented by the general formula (1) given below and/or an epoxy compound having a structure as represented by the general formula (2) given below;

[Chemical compound 1]

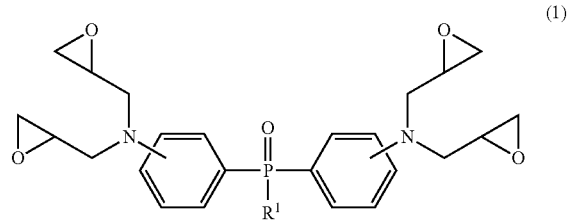

[Chemical compound 2]

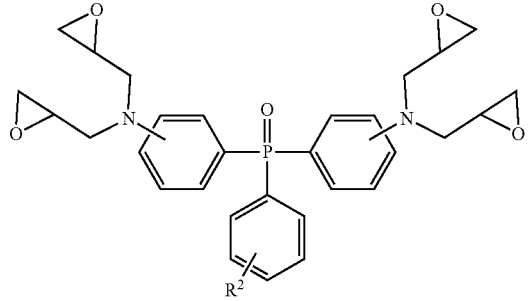

(2)

[Chemical compound 3]

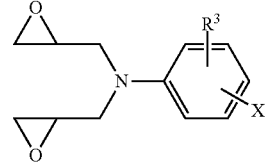

(3)

(wherein in the general formula (1), $R^1$ is a hydrocarbon group containing 2 to 4 carbon atoms; and in general formula (2), $R^2$ is a hydrogen atom or a glycidylamino group.)

In addition, the prepreg according to the present invention is a prepreg that includes the above epoxy resin composition and reinforcing fibers impregnated therewith.

Furthermore, the fiber reinforced composite material according to the present invention is a fiber reinforced composite material produced by curing the above prepreg or a fiber reinforced composite material that contains a cured resin product produced by curing the above epoxy resin composition and reinforcing fibers.

Advantageous Effects of the Invention

The present invention makes it possible to provide an epoxy resin composition that can be cured into a resin product having a high fire retardance and good mechanical characteristics and also provide a prepreg and a fiber reinforced composite material formed thereof.

DESCRIPTION OF PREFERRED EMBODIMENTS

The epoxy resin composition according to the present invention contains the components [A] and [B] specified below:

[A] a bifunctional glycidylamine type epoxy compound, and

[B] an epoxy compound having a structure as represented by the general formula (1) given above and/or an epoxy compound having a structure as represented by the general formula (2) given above.

As the number of carbon atoms in $R^1$ decreases in the general formula (1) given above, the hydrophobicity of an amine based curing agent having the structure represented by the general formula (1) may become so low that the resulting cured resin product will be lower in the resistance to moisture absorption. Therefore, it is preferable for $R^1$ to have four carbon atoms.

For the present invention, the component [A] is a bifunctional glycidylamine type epoxy compound.

In particular, it is preferable for the component [A] to have a structure as represented by the general formula (3) given below because it can ensure a drastically increased formation rate of char of a cured resin product.

(In the general formula (3), $R^3$ is one selected from the group consisting of a hydrogen atom, an aliphatic hydrocarbon group having 1 to 4 carbon atoms, an alicyclic hydrocarbon group having 3 to 6 carbon atoms, an aromatic hydrocarbon group having 6 to 10 carbon atoms, a halogen atom, an acyl group, a trifluoromethyl group, and a nitro group. X is one selected from the group consisting of a hydrogen atom, an aliphatic hydrocarbon group having 1 to 4 carbon atoms, and a substituent group having a ring structure containing a four- or more membered ring.)

In the general formula (3) given above, it is preferable for X to be a substituent group having an aromatic ring from the viewpoint of producing a cured resin product having high fire retardance and high flexural modulus and providing a fiber reinforced composite material having high compression strength.

Specific examples of the component [A] include monoamine type epoxy resins such as N,N-diglycidyl- 4-phenoxy aniline, N,N-diglycidyl-o-toluidine, N,N-diglycidyl-m-toluidine, N,N-diglycidyl-p-toluidine, N,N-dialycidyl-2,3-xylidine, N,N-diglycidyl-2,4-xylidine, N,N-diglycidyl-3,4-xylidine, and N,N-diglycidyl aniline. These epoxy resins for the component [A] may be used singly or as a combination of two or more thereof.

For the present invention, it is preferable for the component [A] to account for 10 to 50 parts by mass, more preferably 25 to 40 parts by mass, of the total quantity, i.e. 100 parts by mass, of the epoxy compound from the viewpoint of ensuring high heat resistance and good mechanical characteristics. Here, the total quantity of the epoxy compound means the total quantity of all epoxy components including the component [A], component [B], and epoxy components other than [A] and [B].

For the present invention, the component [B] is an epoxy compound having a structure as represented by the general formula (1) given above and/or an epoxy compound having a structure as represented by the general formula (2) given above. The addition of such an epoxy compound to an epoxy resin composition serves to develop flame retardance.

Examples of the component [B] used for the present invention include tris((4-diglycidylamino)phenyl) phosphine oxide, tris((3-diglycidylamino)phenyl) phosphine oxide, tris((2-diglycidylamino)phenyl) phosphine oxide, bis((4-diglycidylamino)phenyl) phenylphosphine oxide, bis((3-diglycidylamino)phenyl) phenylphosphine oxide, bis((4-diglycidylamino)phenyl) ethylphosphine oxide, bis((3-diglycidylamino)phenyl) ethylphosphine oxide, bis((2-diglycidylamino)phenyl) ethylphosphine oxide, bis((4-diglycidylamino)phenyl) n-propylphosphine oxide, bis((3-diglycidylamino)phenyl) n-propylphosphine oxide, bis((4-diglycidylamino)phenyl) isopropylphosphine oxide, bis((3-diglycidylamino)phenyl) isopropylphosphine oxide, bis((4-diglycidylamino)phenyl) n-butylphosphine oxide, bis((3-diglycidylamino)phenyl) n-butylphosphine oxide, bis((4-diglycidylamino)phenyl) isobutylphosphine oxide, and bis ((3-diglycidylamino)phenyl) isobutylphosphine oxide. Of these, tris((3-diglycidylamino)phenyl) phosphine oxide is preferred because it is high in elastic modulus and heat resistance.

For the present invention, it is preferable for the component [B] to account for 10 to 90 parts by mass, more preferably 25 to 90 parts by mass, of the total quantity, i.e. 100 parts by mass, of the epoxy compound from the viewpoint of enabling the production of a cured product and a fiber reinforced composite material having high fire retardance and good mechanical characteristics.

For the present invention, it is preferable for the component [B] to account for 0.1 to 5.0 parts by mass of the total mass of the phosphorus atom contained in the epoxy resin composition because it serves to produce a cured product and a fiber reinforced composite material having both high fire retardance and good mechanical characteristics. The phosphorus atom content described above is more preferably 0.3 to 4.0 mass %. The phosphorus atom content (mass %) referred to herein can be calculated as follows: total mass of phosphorus atom contained in the epoxy resin composition (g)/total mass of the epoxy resin composition (g)×100. To calculate the total mass of the phosphorus atoms, the mass of the phosphorus atoms in one molecule of the compound of the component [B] is determined from the atomic weight of a phosphorus atom, and the total number of molecules of the compound of the component [B] contained in the epoxy resin composition is determined from the number of moles, followed by multiplying them together. Apart from the calculation method described above, the phosphorus atom content in an epoxy resin composition can also be calculated from organic element analysis or ICP-MS (inductively coupled plasma mass spectroscopy) of the epoxy resin composition or cured resin product.

For the present invention, an epoxy resin other than the components [A] and [B] may be included. Examples thereof include tetra- or lower functional glycidyl ether type epoxy resins and glycidyl amine type epoxy resins. Such glycidyl ether type epoxy resins include bisphenol type epoxy resins such as bisphenol A type epoxy resins, bisphenol F type epoxy resins, bisphenol AD type epoxy resins, and bisphenol S type epoxy resins, as well as epoxy resins having biphenyl backbone, epoxy resins having naphthalene backbone, and epoxy resins having dicyclopentadiene backbone.

Exemplary such glycidyl amine type epoxy resins include aminophenol type epoxy resins such as N,N,O-triglycidyl-m-aminophenol, N,N,O-triglycidyl-p-aminophenol, and N,N,O-triglycidyl-4-amino-3-methyl phenol; and diamine type epoxy resins such as N,N,N',N'-tetraglycidyl-4,4'-methylene dianiline, N,N,N',N'-tetraglycidyl-2,2'-diethyl-4,4'-methylene dianiline, and N,N,N',N'-tetraglycidyl-m-xylylene diamine.

It is preferable for the epoxy resin other than the components [A] and [B] to account for 0 to 80 parts by mass of the total quantity, i.e. 100 parts by mass, of the epoxy compound in order to ensure the production of a cure product and a fiber reinforced composite material having high fire retardance and good mechanical characteristics.

For the present invention, it is preferable to add a curing agent to allow the epoxy resin to react to form a crosslinked structure. A curing agent as described herein is a curing agent for the epoxy resin and it is a compound having an active group that can react with the epoxy group. Examples of the curing agent include dicyandiamides, aromatic polyamines, aminobenzoic acid esters, various acid anhydrides, phenol novolac resins, cresol novolac resins, polyphenol compounds, imidazole derivatives, aliphatic amines, tetramethyl guanidine, thiourea-added amines, methylhexahydrophthalic anhydrides, other similar carboxylic anhydrides, carboxylic acid hydrazides, carboxylic acid amides, polymercaptan, boron trifluoride-ethylamine complexes, and other similar Lewis acid complexes. In particular, the use of an aromatic polyamine as curing agent serves for easy production of a cured epoxy resin product having high heat resistance. In particular, among other aromatic polyamines, the selection of an appropriate one from the various isomers of diaminodiphenyl sulfone such as 4,4'-diaminodiphenyl sulfone and 3,3'-diaminodiphenyl sulfone makes it easier to produce a highly heat resistant cured epoxy resin product.

The favorable content range of the curing agent depends on the curing agent in use, but it is preferable from the viewpoint of ensuring high heat resistance and good mechanical characteristics that the ratio of the content of the active hydrogen in the aromatic polyamine to that of the epoxy group is in the range of 0.7 to 1.2. In addition, it is preferable for the dicyandiamide in use to account for 1 to 10 parts by mass of the total quantity, i.e. 100 parts by mass, of the epoxy compound from the viewpoint of ensuring high heat resistance and good mechanical characteristics.

For the present invention, a thermoplastic resin may be further included as component [C] in order to allow a prepreg having a favorably controlled tackiness to be formed, control the flowability of the resin during the impregnation of reinforcing fibers with the epoxy resin composition, and produce a fiber reinforced composite material having high toughness. It is preferable for such a thermoplastic resin composition to be dissolved in the epoxy resin. The term "being dissolved" used herein means that when 3 parts by mass of powder of the component [C], which is in the form of mechanically crushed or chemically micronized particles with an average particle diameter of 100 μm or less, is added to 100 parts by mass of tetraglycidyldiaminodiphenyl methane and maintained at a temperature of 100° C. or more for 4 hours while mechanically stirring, the resulting liquid is in an optically transparent state. The thermoplastic resin used as the component [C] is preferably a thermoplastic resin having a polyaryl ether backbone. Specific examples include polysulfone, polyphenyl sulfone, polyethersulfone, polyetherimide, polyphenylene ether, polyether ether ketone, and polyether ether sulfone. These thermoplastic resins having polyaryl ether backbones may be used singly or in combination as appropriate. In particular, polyethersulfone and polyetherimide can be used suitably not only because they serve to produce a tough fiber reinforced composite material without impairing the heat resistance or mechanical properties, but also because they themselves are high in fire retardance. It is preferable for the component [C] to account for 5 to 40 parts by mass relative to the total quantity, i.e. 100 parts by mass, of the epoxy compound from the viewpoint of ensuring high fire retardance and good mechanical characteristics.

For the present invention, particles that contain a thermoplastic resin as primary component may be added in order to produce a fiber reinforced composite material having improved impact resistance. Such a particle component may be partly mixed completely with or swollen in the epoxy resin, but it is preferable that after the curing of the matrix resin, which is formed mainly of epoxy resin, they persist in being particles when observed by microscopy.

Useful materials for such thermoplastic resin particles include polyamide, polyimide, and polyamide-imide. Of these, polyamide is most preferable, and particularly preferred polyamide species include polyamide 12, polyamide 6, polyamide 11, polyamide 66, polyamide 6/12 copolymer, 4,4'-methylene bis(cyclohexylamine), and structural isomers thereof, as well as polyamides produced through condensation polymerization of an alkyl or halogen substituted alicyclic diamine and a dibasic acid, and polyamide polymers modified with an epoxy compound into a semi-IPN structure (semi-IPN polyamide) as described in Example 1 of Japanese Unexamined Patent Publication (Kokai) No. HEI 1-104624, which can develop particularly high adhesive strength with epoxy resin. Here, IPN stands for interpenetrating polymer network, which is a kind of polymer blend structure. Specifically, crosslinked polymers are adopted as blend components and the dissimilar crosslinked polymers are partially or fully entangled to form a multiple polymer network. A semi-IPN has a multiple polymer network formed of a crosslinked polymer and a straight-chain polymer. For example, a semi-IPN formed of thermoplastic resin particles can be produced by dissolving a thermoplastic resin and a thermosetting resin in a common solvent to ensure uniform mixing, followed by performing reprecipitation. The use of particles formed of an epoxy resin and a semi-IPN polyamide serves to produce a prepreg having a high heat resistance and high impact resistance. Particles of polyamide-imide, polyimide, etc., are used suitably in cases where heat resistance to temperatures above 200° C. is required. In regard to the shape of these thermoplastic resin particles, they may be spherical particles, non-spherical particles, or porous particles, of which spherical particles are preferable because they ensure high viscoelasticity by preventing deterioration in the flow characteristics of the resin and also ensure high impact resistance by eliminating potential starting points of stress concentrations. The diameter of the particles is not particularly limited, but the use of particles having a D50 diameter in the range of 1 to 50 µm as determined by the laser diffraction method using a particle size distribution measuring apparatus is preferred from the viewpoint of ensuring high dispersibility in epoxy resin and good mechanical characteristics.

Commercial products of useful polyamide particles include SP-500, SP-10, TR-1, TR-2, 842P-48, 842P-80 (all manufactured by Toray Industries, Inc.), Orgasol (registered trademark) 1002D, 2001UD, 2001EXD, 2002D, 3202D, 3501D, and 3502D (all manufactured by Arkema K. K.). These polyamide particle materials may be used singly, or a plurality thereof may be used in combination.

The epoxy resin composition according to the present invention may contain a coupling agent, thermosetting resin particles, or an inorganic filler such as silica gel, carbon black, clay, carbon nanotube, graphene, carbon particles, aluminum hydroxide, magnesium hydroxide, and boron nitride, unless they impair the advantageous effects of the invention.

The prepreg according to the present invention is produced by impregnating reinforcing fibers with the epoxy resin composition according to the present invention. More specifically, the epoxy resin composition described above is used as the matrix resin, and this epoxy resin composition is combined with reinforcing fibers. Examples of preferred reinforcing fibers include carbon fiber, graphite fiber, aramid fiber, and glass fiber. Of these, carbon fiber is particularly preferable from the viewpoint of ensuring good mechanical characteristics. In regard to such carbon fibers and graphite fibers, it is preferable to adopt a carbon fiber with an elastic modulus of 200 to 450 GPa from the viewpoint of ensuring a specific modulus that is required to provide lightweight final products.

To produce the prepreg according to the present invention, there are a variety of generally known production methods such as the wet process and the hot melt process. Of these, the hot melt process is preferred because it serves more effectively to realize the advantage effects of the invention.

The hot melt process is a solvent free technique designed to impregnating reinforcing fibers with a resin that is heated to decrease its viscosity. The hot melt process can be carried out by some different procedures including a procedure in which a matrix resin heated to decrease the viscosity is used for direct impregnation of reinforcing fibers and a procedure in which release paper sheets etc. laid with resin films are prepared by coating release paper sheets with a matrix resin and then used to cover either or both surfaces of a reinforcing fiber sheet, followed by applying heat and pressure to ensure the impregnation of the reinforcing fiber sheet with the matrix resin.

For the prepreg according to the present invention, it is preferable for the reinforcing fiber sheets to have an areal weight of 100 to 1,000 $g/m^2$. If the areal weight of the reinforcing fiber sheets is less than 100 $g/m^2$, a larger number of sheets have to be stacked in some cases to ensure a required thickness when molding a fiber reinforced composite material, possibly leading to troublesome lamination operation. On the other hand, if it is more than 1,000 $g/m^2$, the prepreg tends to deteriorate in drapability. In addition, the fiber content by mass is preferably 40 to 90 mass %, and more preferably 50 to 80 mass %. If the fiber content by mass is less than 40 mass %, the resin content will be so large in some cases that the good mechanical characteristics of the reinforcing fibers may not be made use of effectively and an excessively large heat generation can occur during curing of a fiber reinforced composite material. If the fiber content by mass is more than 90 mass %, defective impregnation with resin will be likely to occur, possibly resulting in a fiber reinforced composite material containing many voids.

In regard to the structure of the prepreg according to the present invention, it may be a unidirectional (UD) prepreg, a woven prepreg, or a nonwoven fabric such as sheet molding compound.

The first embodiment of the fiber reinforced composite material according to the present invention is a cured product of the prepreg according to the present invention. Such a fiber reinforced composite material can be produced by, for example, piling up sheets of the prepreg according to the invention in a desired shape and then applying heat and pressure to cure the resin. Here, the application of heat and pressure can be carried out by using a generally known method such as the autoclave molding method, press molding method, bag molding method, wrapping tape method, and internal pressure molding method.

The second embodiment of the fiber reinforced composite material according to the present invention includes reinforcing fibers and a cured resin product prepared by curing the epoxy resin composition according to the present invention. Instead of using a prepreg, such a fiber reinforced composite material can be produced by impregnating a reinforcing fiber base directly with a liquid state epoxy resin and then curing the resin. More specifically, a fiber reinforced composite material can be produced by such a method as the resin transfer molding method, filament winding method, pultrusion method, and hand lay-up method.

EXAMPLES

The present invention will be described below with reference to examples, though the present invention is not limited to these examples.

Listed below are materials used in the examples and comparative examples of the present invention.
<Component [A]: a Bifunctional Glycidylamine Type Epoxy Compound>
    N,N-diglycidyl-p-phenoxyaniline (TOREP A-204E, manufactured by Toray Fine Chemicals Co., Ltd.)
    N,N-diglycidylaniline (GAN, manufactured by Nippon Kayaku Co., Ltd.)
    N,N-diglycidyl-o-toluidine (GOT, manufactured by Nippon Kayaku Co., Ltd.)
<Component [B]: an Epoxy Compound Having a Structure as Represented by the General Formula (1) or (2) Given Above>
    tris((3-diglycidylamino)phenyl) phosphine oxide (manufactured by Katayama Chemical Industries Co., Ltd.)
    bis((3-diglycidylamino)phenyl) n-butyl phosphine oxide (manufactured by Katayama Chemical Industries Co., Ltd.)
<Epoxy Compound Other than Components [A] and [B]>
    tetraglycidyldiaminodiphenyl methane (Araldite (registered trademark) MY721, manufactured by Huntsman Advanced Materials)
    bisphenol A type epoxy resin (jER (registered trademark) 825, manufactured by Mitsubishi Chemical Corporation)
<Curing Agent>
    3,3'-diaminodiphenyl sulfone (manufactured by Konishi Chemical Ind. Co., Ltd.)
    4,4'-diaminodiphenyl methane (manufactured by Tokyo Chemical Industry Co., Ltd.)
<Component [C]: Thermoplastic Resin>
    polyethersulfone (VIRANTAGE (registered trademark) VW-10700RFP, manufactured by Solvay Advanced Polymers)

(1) Preparation Method for Epoxy Resin Composition

In a kneading apparatus, an epoxy compound corresponding to the component [A], an epoxy compound corresponding to the component [B], an epoxy compound other than the components [A] and [B], and a thermoplastic resin corresponding to the component [C] were fed as described in Table 1 and then heated and kneaded to dissolve the thermoplastic resin. Subsequently, the temperature was decreased to less than 80° C. and a curing agent as given in Table 1 was added, followed by stirring to provide an epoxy resin composition.

(2) Evaluation of Flame Retardance of Cured Resin Product

Flame retardance evaluation was performed by thermogravimetric analysis (TGA) as described below.

The epoxy resin composition prepared in section (1) was deaerated in a vacuum and injected in a mold that was set up using a 2 mm thick Teflon (trademark) spacer to ensure a thickness of 2 mm, followed by curing at a temperature of 180° C. for 2 hours to provide a cured epoxy resin product with a thickness of 2 mm. The flame retardance evaluation was performed by using a thermogravimetric analysis apparatus TG-DTA (WS003 System, manufactured by Bruker AXS). An approximately 10 mg test piece was cut out of the cured epoxy resin product and simply heated at a heating rate of 10° C./min. The char formation rate (%) at 600° C. was measured to serve as an indicator of the fire retardance. The char formation rate referred to herein is a value calculated as followed: (mass of heat decomposition residue at 600° C. (g))/(mass of cured epoxy resin product before measurement (g))×100.

(3) Evaluation of Mechanical Characteristics of Cured Resin Product

Evaluation of the mechanical characteristics of a cured resin product was performed as described below.

A test piece having a size of 10 mm×60 mm was cut out of the cured epoxy resin product prepared in section (2) and subjected to three point bending test according to JIS K7171 (2006) to evaluate the mechanical characteristics. The flexural modulus was determined based on bending test that was performed using an Instron 5565 type universal tester (manufactured by Instron Corporation) under the conditions of a crosshead speed of 2.5 mm/rein, span of 40 mm, indenter diameter of 10 mm, and fulcrum diameter of 4 mm.

Example 1

As shown in Table 1, using 35 parts by mass of N,N-diglycidyl-p-phenoxy aniline (PxGAN) as the component [A], 53 parts by mass of tris((3-diglycidylamino)phenyl) phosphine oxide as the component [B], 12 parts by mass of tetraglycidyldiaminodiphenyl methane (Araldite (registered trademark) MY721) as epoxy compound other than the components [A] and [B], 41 parts by mass of 3,3'-diaminodiphenyl sulfone as curing agent, and 25 parts by mass of polyethersulfone (VIRANTAGE (registered trademark) VW-10700RFP) as the component [C], an epoxy resin composition was produced, and the resulting resin composition was cured at a temperature of 180° C. for 2 hours to provide a cured resin product, which was subjected to fire retardance evaluation and mechanical characteristics evaluation. The total phosphorus atom content in all epoxy resins was 1.5 mass %. In regard to the fire retardance, the char formation rate at 600° C. was 38%. In regard to the mechanical characteristics, the test piece showed a flexural modulus of 5.1 GPa as well as high fire retardance and good mechanical characteristics, Example 2

Except for using 41 parts by mass of bis((3-diglycidylamino)phenyl) n-butylphosphine oxide as the component [B], 24 parts by mass of tetraglycidyldiaminodiphenyl methane as epoxy compound other than the components [A] and [B], and 39 parts by mass of 3,3'-diaminodiphenyl sulfone as curing agent as shown in Table 1, the same procedure as in Example 1 was carried out to produce an epoxy resin composition, and a cured resin product was prepared and subjected to fire retardance evaluation and mechanical characteristics evaluation. The total phosphorus atom content in all epoxy resins was 1.5 mass %. High fire retardance and mod mechanical characteristics were realized as in Example 1.

Example 3

Except for using 13 parts by mass of 3,3'-diaminodiphenyl sulfone and 25 parts by mass of tris(aminophenyl) phosphine oxide as curing agent and 24 parts by mass of polyethersulfone as the component [C] as shown in Table 1, the same procedure as in Example 1 was carried out to produce an epoxy resin composition, and a cured resin product was prepared and subjected to fire retardance evaluation and mechanical characteristics evaluation. The total phosphorus atom content in all epoxy resins was 3.0 mass %. High fire retardance and mod mechanical characteristics were realized as in Example 1.

Example 4

Except for using 41 parts by mass of bis((3-diglycidylamino)phenyl) n-butylphosphine oxide as the component [B], 24 parts by mass of tetraglycidyldiaminodiphenyl methane as epoxy compound other than the components [A] and [B], 24 parts by mass of tris(aminophenyl) phosphine oxide as curing agent, and 24 parts by mass of polyethersulfone as the component [C] as shown in Table 1, the same procedure as in Example 1 was carried out to produce an epoxy resin composition, and a cured resin product was prepared and subjected to fire retardance evaluation and mechanical characteristics evaluation. The total phosphorus atom content in all epoxy resins was 3.0 mass %. High fire retardance and good mechanical characteristics were realized as in Example 1.

Example 5

Except for using 35 parts by mass of N,N-diglycidylaniline (GAN) as the component [A], 56 parts by mass of tris((3-diglycidylamino)phenyl) phosphine oxide as the component [B], 9 parts by mass of tetraglycidyldiaminodiphenyl methane as epoxy compound other than the components [A] and [B], 48 parts by mass of 3,3'-diaminodiphenyl sulfone as curing agent, and 26 parts by mass of polyethersulfone as the component [C] as shown in Table 1, the same procedure as in Example 1 was carried out to produce an epoxy resin composition, and a cured resin product was prepared and subjected to fire retardance evaluation and mechanical characteristics evaluation. The total phosphorus atom content in all epoxy resins was 1.5 mass %. High fire retardance and good mechanical characteristics were realized as in Example 1.

Example 6

Except for using 35 parts by mass of N,N-diglycidylaniline (GAN) as the component [A], 43 parts by mass of bis((3-diglycidylamino)phenyl) n-butylphosphine oxide as the component [B], 23 parts by mass of tetraglycidyldiaminodiphenyl methane as epoxy compound other than the components [A] and [B], 46 parts by mass of 3,3'-diaminodiphenyl sulfone as curing agent, and 26 parts by mass of polyethersulfone as the component [C] as shown in Table 1, the same procedure as in Example 1 was carried out to produce an epoxy resin composition, and a cured resin product was prepared and subjected to fire retardance evaluation and mechanical characteristics evaluation. The total phosphorus atom content in all epoxy resins was 1.5 mass %. High fire retardance and good mechanical characteristics were realized as in Example 1.

Example 7

Except for using 35 parts by mass of N,N-diglycidyl-o-toluidine (GOT) as the component [A], 41 parts by mass of bis((3-diglycidylamino)phenyl) n-butylphosphine oxide as the component [B], 24 parts by mass of tetraglycidyldiaminodiphenyl methane as epoxy compound other than the components [A] and [B], and 42 parts by mass of 3,3'-diaminodiphenyl sulfone as curing agent as shown in Table 1, the same procedure as in Example 1 was carried out to produce an epoxy resin composition, and a cured resin product was prepared and subjected to fire retardance evaluation and mechanical characteristics evaluation. The total phosphorus atom content in all epoxy resins was 1.5 mass %. High fire retardance and good mechanical characteristics were realized as in Example 1.

Example 8

Except for using 50 parts by mass of N,N-diglycidyl-o-toluidine (GOT) as the component [A], 47 parts by mass of bis((3-diglycidylamino)phenyl) n-butylphosphine oxide as the component [B], 18 parts by mass of tetraglycidyldiaminodiphenyl methane as epoxy compound other than the components [A] and [B], 47 parts by mass of 3,3'-diaminodiphenyl sulfone as curing agent, and 29 parts by mass of polyethersulfone as the component [C] as shown in Table 1, the same procedure as in Example 1 was carried out to produce an epoxy resin composition, and a cured resin product was prepared and subjected to fire retardance evaluation and mechanical characteristics evaluation. The total phosphorus atom content in all epoxy resins was 1.5 mass %. High fire retardance and good mechanical characteristics were realized as in Example 1.

Comparative Example 1

Except for omitting the use of the component [A] and the component [C] and using 20 parts by mass of tris((3-diglycidylamino)phenyl) phosphine oxide as the component [B], 80 parts by mass of a bisphenol A type epoxy resin (jER (registered trademark) 825) as epoxy compound other than the components [A] and [B], and 31 parts by mass of 4,4'-diaminodiphenyl methane as curing agent as shown in Table 1, the same procedure as in Example 1 was carried out to produce an epoxy resin composition, and a cured resin product was prepared and subjected to fire retardance evaluation. The total phosphorus atom content in all epoxy resins was 0.7 mass %, The fire retardance was considerably deteriorated as compared with Example 1.

Comparative Example 2

Except for omitting the use of the component [A] and the component [C] and using 42 parts by mass of tris((3-diglycidylamino)phenyl) phosphine oxide as the component [B], 58 parts by mass of a bisphenol A type epoxy resin as epoxy compound other than the components [A] and [B], and 33 parts by mass of 4,4'-diaminodiphenyl methane as curing agent as shown in Table 1, the same procedure as in Example 1 was carried out to produce an epoxy resin composition, and a cured resin product was prepared and subjected to fire retardance evaluation and mechanical characteristics evaluation. The total phosphorus atom content in all epoxy resins was 1.5 mass %. The fire retardance and mechanical characteristics were considerably deteriorated as compared with Example 1.

Comparative Example 3

Except for omitting the use of the component [B] and using 65 parts by mass of tetraglycidyldiaminodiphenyl methane as epoxy compound other than the components [A] and [B] and 44 parts by mass of 3,3'-diaminodiphenyl sulfone as curing agent as shown in Table 1, the same procedure as in Example 1 was carried out to produce an epoxy resin composition, and a cured resin product was prepared and subjected to fire retardance evaluation and mechanical characteristics evaluation. The total phosphorus atom content in all epoxy resins was 0 mass %. The fire retardance and mechanical characteristics were considerably deteriorated as compared with Example 1.

Due to the combined use of the components [A] and [B], the cured resin products prepared from samples of the epoxy resin composition according to the present invention have higher fire retardance and better mechanical characteristics than those prepared in Comparative examples.

TABLE 1

| | | Example 1 | Example 2 | Example 3 | Example 4 | Example 5 | Example 6 | Example 7 | Example 8 | Comparative example 1 | Comparative example 2 | Comparative example 3 |
|---|---|---|---|---|---|---|---|---|---|---|---|---|
| Epoxy resin composition (parts by mass) | | Component [A] epoxy compound having a structure as represented by general formula (3) | | | | | | | | | | |
| | N,N-diglycidyl-p-phenoxy aniline (PxGAN) | 35 | 35 | 35 | 35 | | | | | | | 35 |
| | N,N-diglycidyl aniline (GAN) | | | | | 35 | 35 | | | | | |
| | N,N-diglycidyl-o-toluidine (GOT) | | | | | | | 35 | 50 | | | |
| | | Component [B] epoxy compound having a structure as represented by general formula (1) or (2) | | | | | | | | | | |
| | tris-((3-diglycidyl-amino)phenyl) phosphine oxide | 53 | | 53 | | 56 | | | | 20 | 42 | |
| | bis((3-diglycidyl-amino)phenyl) n-butylphosphine oxide | | 41 | | 41 | | 43 | 41 | 47 | | | |
| | | Epoxy compound other than components [A] and [B] | | | | | | | | | | |
| | tetraglycidyldiamino-diphenyl methane (Araldite® MY721) | 12 | 24 | 12 | 24 | 9 | 23 | 24 | 18 | | | 65 |
| | bisphenol A type epoxy resin (jER® 825) | | | | | | | | | 80 | 58 | |
| | | Curing agent | | | | | | | | | | |
| | 3,3'-diamino-diphenyl sulfone | 41 | 39 | 13 | | 48 | 46 | 42 | 47 | | | 44 |
| | tris(amino-phenyl)phosphine oxide | | | 25 | 24 | | | | | | | |
| | 4,4'-diamino-diphenyl methane | | | | | | | | | 31 | 33 | |
| | | Component [C] thermoplastic resin | | | | | | | | | | |
| | polyethersulfone (VIRANTAGE® VW-10700RFP) | 25 | 25 | 24 | 24 | 26 | 26 | 25 | 29 | | | 25 |
| Phosphorus atom content in epoxy resin composition (mass %) | | 1.5 | 1.5 | 3.0 | 3.0 | 1.5 | 1.5 | 1.5 | 1.5 | 0.7 | 1.5 | 0 |
| Characteristics of cured resin product | char formation rate at 600° C. (%) | 38 | 30 | 38 | 36 | 40 | 36 | 37 | 33 | 10 | 17 | 18 |
| | flexural modulus (GPa) | 5.1 | 4.6 | 5.2 | 4.7 | 5.5 | 5.1 | 4.9 | 4.9 | — | 4.0 | 4.3 |

The invention claimed is:

1. An epoxy resin composition comprising components [A] and [B] as specified below and comprising 9 to 24 parts by mass of tetraglycidyldiaminodiphenyl methane per 100 parts by mass of a total of epoxy compounds:
   [A] a bifunctional glycidylamine epoxy compound, and
   [B] 25 to 90 parts by mass of an epoxy compound having a structure of formula (2) given below per 100 parts by mass of the total epoxy compounds,

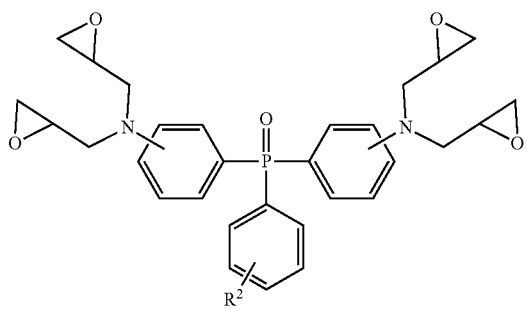

(2)

wherein $R^2$ is a diglycidylamino group.

2. An epoxy resin composition as set forth in claim 1, wherein the component [A] has a structure as represented by chemical formula (3) given below:

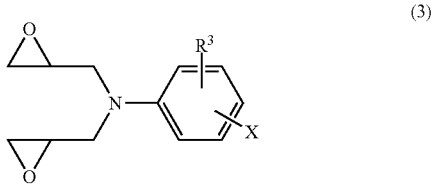

(3)

wherein $R^3$ is one selected from the group consisting of a hydrogen atom, an aliphatic hydrocarbon group having 1 to 4 carbon atoms, an alicyclic hydrocarbon group having 3 to 6 carbon atoms, an aromatic hydrocarbon group having 6 to 10 carbon atoms, a halogen atom, an acyl group, a trifluoromethyl group, and a nitro group; and X is one selected from the group consisting of a hydrogen atom, an aliphatic hydrocarbon group having 1 to 4 carbon atoms, and a substituent group having a ring structure containing a four or more membered ring.

3. An epoxy resin composition as set forth in claim 1, wherein the component [A] accounts for 10 to 50 parts by mass relative to the total epoxy resin compound content of 100 parts by mass.

4. An epoxy resin composition as set forth in claim 1, further comprising a thermoplastic resin as component [C].

5. A prepreg comprising an epoxy resin composition as set forth in claim 1 and reinforcing fibers impregnated therewith.

6. A fiber reinforced composite material produced by curing a prepreg as set forth in claim 5.

7. A fiber reinforced composite material comprising a cured resin product produced by curing an epoxy resin composition as set forth in claim 1 and reinforcing fibers.

* * * * *